(12) United States Patent
Naoi et al.

(10) Patent No.: US 7,820,337 B2
(45) Date of Patent: Oct. 26, 2010

(54) ELECTROCHEMICAL DEVICE

(75) Inventors: Katsuo Naoi, Tokyo (JP); Kenji Nishizawa, Tokyo (JP); Keita Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 82 days.

(21) Appl. No.: 12/053,074

(22) Filed: Mar. 21, 2008

(65) Prior Publication Data
US 2008/0241676 A1 Oct. 2, 2008

(30) Foreign Application Priority Data
Mar. 30, 2007 (JP) .......................... P2007-094156

(51) Int. Cl.
H01M 2/02 (2006.01)
(52) U.S. Cl. .................. 429/507; 429/508; 429/517; 29/623.2
(58) Field of Classification Search .................. 429/179, 429/507, 508, 517
See application file for complete search history.

(56) References Cited

U.S. PATENT DOCUMENTS
2006/0216594 A1* 9/2006 You et al. .................... 429/180

FOREIGN PATENT DOCUMENTS
| JP | A-2000-077044 | 3/2000 |
| JP | A-2002-56839 | 2/2002 |
| JP | A-2004-362935 | 12/2004 |

OTHER PUBLICATIONS
Nov. 17, 2009 Office Action issued in Japanese Patent Application No. 2007-094156.

* cited by examiner

Primary Examiner—Jane Rhee
(74) Attorney, Agent, or Firm—Oliff & Berridge, PLC

(57) ABSTRACT

An electrochemical device has an armor; a structure housed in the armor and having a separator disposed between first and second electrodes; and external terminals with respective leads connected to the first and second electrodes of the structure, respectively, and extending from the interior of the armor across a sealed portion of the armor to the outside; at least a surface of an intersection in each of the leads crossing the sealed portion is provided with at least one of depressed portion and projected portion. This electrochemical device is realized in compact size and with high reliability.

4 Claims, 10 Drawing Sheets (a)

(b)

(a)

(b)

ELECTROCHEMICAL DEVICE

BACKGROUND OF THE INVENTION

1. Field of the Invention

The present invention relates to an electrochemical device.

2. Related Background Art

Recent remarkable development of portable equipment rapidly raises demands for electrochemical devices such as batteries and electric double-layer capacitors used as power supplies for portable equipment. Such electrochemical devices are required to reduce the weight and thickness in association with requirements for downsizing of portable equipment and, for meeting this requirement, a laminate film is being used as an armor. An example of the known electrochemical device using such an armor is the one described in Japanese Patent Application Laid-open No. 2000-77044. This application discloses a lithium-ion secondary battery and this lithium-ion secondary battery is so arranged that a structure including a cathode, an anode, and a separator is housed in the armor and that external terminals connected to the cathode and the anode of the structure extend from the interior of the armor across a sealed portion in the periphery of the armor to the outside.

SUMMARY OF THE INVENTION

Incidentally, the electrochemical devices are also requested to achieve a higher capacity and higher energy density. For this reason, the electrochemical devices with the armor of the laminate film as in the above-mentioned application are required to minimize the width of the sealed portion.

However, a certain seal width is necessary for ensuring the reliability of the electrochemical device. For this reason, it was not easy to ensure the reliability while compacting the electrochemical device.

An object of the present invention is therefore to provide an electrochemical device capable of ensuring high reliability while achieving compactification.

The inventors conducted elaborate research in order to solve the above problem and came to note a surface condition of the external terminals. The inventors found that surfaces were smooth in the external terminals described in the above-mentioned application and then considered that it must make water easy to penetrate through the interface between the surfaces of the external terminals and the armor in contact therewith. The inventors then conducted flier elaborate research and discovered that the above problem was solved by the invention detailed below, thus accomplishing the present invention.

Namely, on aspect of the present invention is an electrochemical device comprising: an armor; a structure housed in the armor and having a first electrode, a second electrode, and a separator disposed between the first electrode and the second electrode; and external terminals with respective leads connected to the first electrode and the second electrode of the structure, respectively, and extending from an interior of the armor across a sealed portion of the armor to the outside; wherein at least a surface of an intersection in each of the leads crossing the sealed portion is provided with at least either of at least one depressed portion and at least one projected portion.

According to the present invention, even if water penetrates into the interior of the armor from the outside of the armor, at least the surface of the intersection in the lead of the external terminal is provided with at least either of at least one depressed portion and at least one projected portion; therefore, a path of passage of water is longer between the surface provided with at least one of the depressed portion and the projected portion and the portion in contact therewith than in the case with neither of the depressed portion and the projected portion. For this reason, it becomes feasible to adequately suppress the penetration of water. Therefore, the reliability is ensured for the electrochemical device. Since at least the surface of the intersection in the lead is provided with at least either of the depressed portion and the projected portion, a contact area is increased between the lead and a contact portion in contact therewith. For this reason, adhesion is adequately enhanced between the lead and the contact portion even if the width of the sealed portion is small.

The electrochemical device is preferably arranged as follows: the surface of the intersection in the lead is provided with the depressed portion but a portion except for the intersection is not provided with the depressed portion.

In this case, the strength of the lead is further increased, when compared with a case where the surface of the portion other than the intersection is also provided with the depressed portion.

The electrochemical device is preferably arranged as follows: a length (A) along the surface of the intersection of the lead is not less than 1.1 times a length (B) of the sealed portion along an extending direction of the external terminal.

In this case, the penetration of water is more adequately suppressed, when compared with cases where A/B is less than 1.1. Namely, an increase in the length (A) means an increase in the length of the lead because of the formation of the depressed portion in the lead, and a sealant of the sealed portion is stored more in this depressed portion than in the portion other than the depressed portion. The sealant stored in the depressed portion functions as a trap or shield to water penetrating from the outside and prevents water from penetrating into the interior of the armor. At this time, an amount of the sealant in the depressed portion can be discussed based on how many times the length (A) is increased relative to the original length. Therefore, if A/B is smaller than 1.1, the effect of the present invention of capability of ensuring high reliability while achieving compactification can be achieved, but the effect of suppressing the penetration of water tends to become weakened because of an insufficient amount of the sealant stored in the depressed portion.

The electrochemical device is preferably arranged as follows: the length (A) along the surface of the intersection of the lead is not less than 1.1 nor more than 3.0 times a width (C) of the lead.

In this case, the penetration of water is suppressed more adequately, when compared with cases where A/C is off the foregoing range. A bubble could exist during a sealing step in the part of the sealed portion other than the intersection of the lead and water in this bubble tends to first move laterally up to the lead and then penetrate along the lead into the interior. When A/C falls in the above range, the laterally moving water is effectively prevented from penetrating along the lead into the interior. Therefore, if A/C is smaller than 1.1, the effect of the present invention of capability of ensuring high reliability while achieving compactification can be achieved, but the effect of suppressing the penetration of water tends to become weakened because of an insufficient amount of the sealant stored in the depressed portion. If A/C is larger than 3.0, the distance becomes too large between upper and lower sealed portions on both sides of the lead and it tends to induce the penetration of water to the contrary.

The electrochemical device is preferably arranged as follows: the depressed portion is a groove and the groove is formed in the surface of the lead so as to cross the extending direction of the lead.

In this case, the penetration of water is suppressed more adequately along the extending direction of the external terminal. Namely, the sealant is stored in the depressed portion of the lead as described above and the sealant functions as a trap or shield to water penetrating from the outside. In the case where the depressed portion is the groove and the groove is formed so as to cross the extending direction of the lead, the trap or shield to water is formed throughout the nearly entire region in the direction of penetration of water, whereby the penetration of water is suppressed more adequately.

Another aspect of the present invention is an electrochemical device produced by a production method of an electrochemical device, the method comprising: preparing a structure housed in an armor with an aperture and having a first electrode, a second electrode, and a separator disposed between the first electrode and the second electrode; and pinching portions of external terminals with respective leads connected to the first electrode and the second electrode of the structure, respectively, and provided with at least one groove in a surface, the portions of the external terminals being provided with the groove, by a sealed portion forming the aperture of the armor, and heat-sealing the external terminals and the sealed portion.

When this electrochemical device is in the step of heat-sealing the external terminals and the sealed portion forming the aperture of the armor, a bubble made between the lead and a contact portion in contact therewith is first driven away along the groove and finally driven away to the outside of the armor. For this reason, the penetration of water due to the bubble is adequately suppressed. Since the groove is formed in the surface of each lead in the resulting electrochemical device, the path of passage of water becomes longer between the surface with the groove and the portion in contact therewith than in the case without the groove. For this reason, it becomes feasible to adequately suppress the penetration of water. The contact area is also increased between the lead and the contact portion in contact therewith. For this reason, adhesion is adequately enhanced between the lead and the contact portion even if the width of the sealed portion is small. Therefore, the electrochemical device is obtained in compact size and with secure reliability.

As described above, the present invention provides the electrochemical device in compact size and with high reliability.

DESCRIPTION OF THE PREFERRED EMBODIMENTS

Embodiments of the present invention will be described below in detail.

First Embodiment

Figure 1:
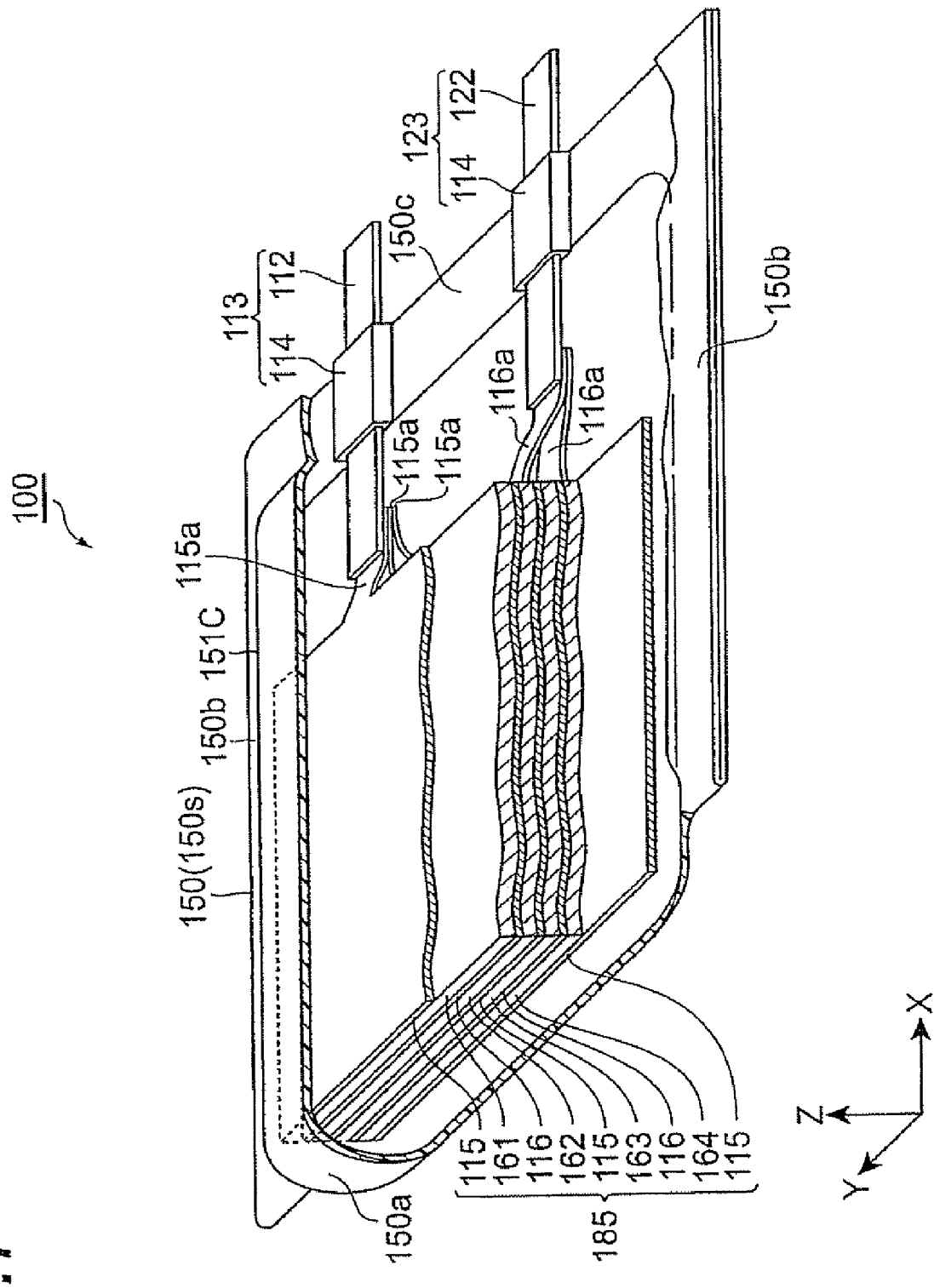
FIG. 1 is a partly broken perspective view showing an embodiment of the electrochemical device according to the present invention.
Figure 2:
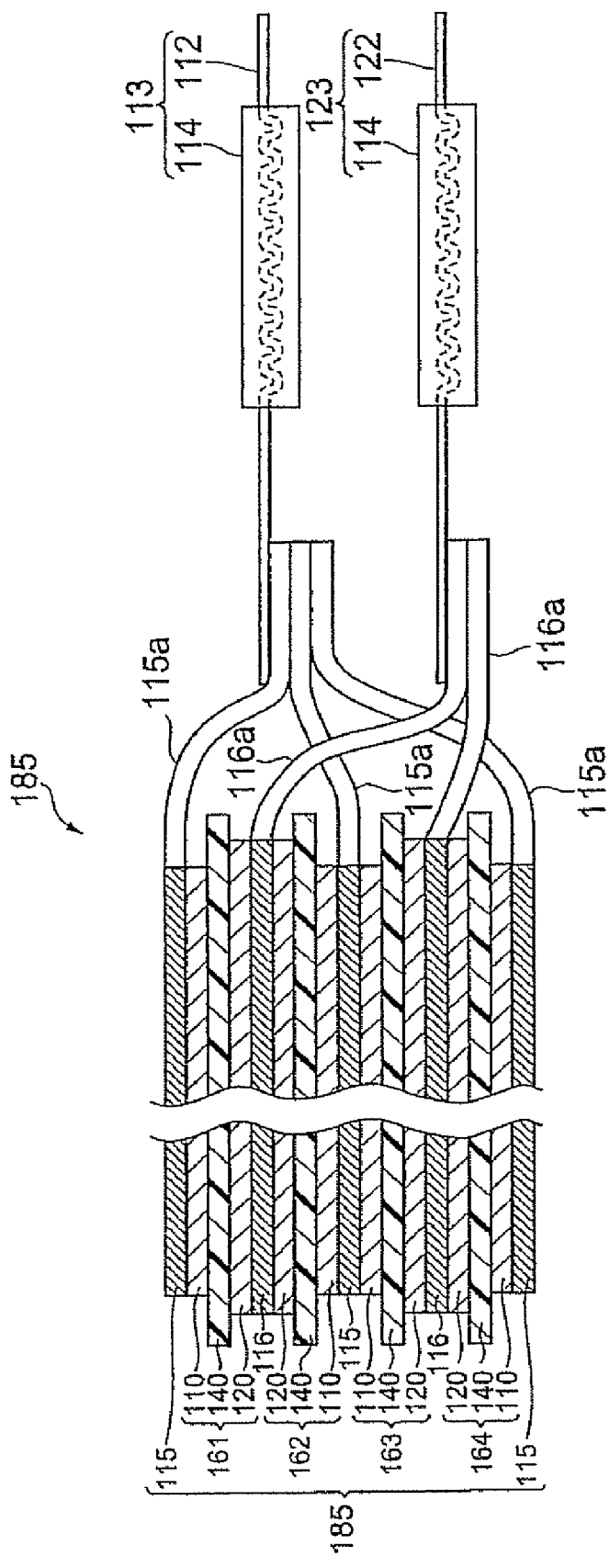
FIG. 2 is a sectional view along the ZX plane of the electrochemical device shown in FIG. 1.

FIG. 1 is a partly broken perspective view showing the first embodiment of the electrochemical device according to the present invention, and shows a lithium-ion secondary battery. FIG. 2 is a sectional view along the ZX plane of the electrochemical device shown in FIG. 1.

The lithium-ion secondary battery 100 of the present embodiment, as shown in FIGS. 1 and 2, is composed mainly of a laminate structure 185, a case (armor) 150 housing the laminate structure 185 in a hermetically closed state, and an external terminal 113 and an external terminal 123 for connection between the laminate structure 185 and the outside of the case 150. The laminate structure 185 has a cathode collector 115, a secondary battery element 161, an anode collector 116, a secondary battery element 162, a cathode collector 115, a secondary battery element 163, an anode collector 116, a secondary battery element 164, and a cathode collector 115 arranged in the order named from top, and each having a platelike shape.

(Secondary Battery Elements)

Each of the secondary battery elements 161, 162, 163, and 164, as shown in FIG. 2, is composed of a platelike cathode active material-containing layer 110 and a platelike anode active material-containing layer 120 opposed to each other, a platelike electrically-insulating separator 140 arranged adjacent to and between the cathode active material-containing layer 110 and the anode active material-containing layer 120, and an electrolyte solution (not shown) containing an electrolyte and contained in the cathode active material-containing, layer 110, the anode active material-containing layer 120, and the separator 140.

The anode active material-containing layer 120 of each secondary battery element 161-164 is formed on a surface of the anode collector 116 and the cathode active material-containing layer 110 of each secondary battery element 161-164 is formed on a surface of the cathode collector 115. An anode is composed of the anode active material-containing layer 120 and the anode collector 116, and a cathode is composed of the cathode active material-containing layer 110 and the cathode collector 115.

(Anode Active Material-Containing Layer)

The anode active material-containing layer 120 is a layer containing an anode active material, a conductive aid, a binder, and so on. The anode active material-containing layer 120 will be described below.

There are no particular restrictions on the anode active material as long as it can implement reversible progress of occlusion and release of lithium ions, desorption and insertion of lithium ions, or doping and dedoping with lithium ions and counter anions thereto (e.g., $ClO_4^-$). The anode active material can be one of the same materials as those used in the well-known lithium-ion secondary battery elements. Examples of such materials include carbon materials such as natural graphite, artificial graphite, mesocarbon microbeads, mesocarbon fiber (MCF), cokes, glasslike carbon, and burned substances of organic compounds; metals such as Al, Si, and Sn capable of combining with lithium; amorphous compounds consisting primarily of an oxide such as $SiO_2$ or $SnO_2$; lithium titanate ($Li_4Ti_5O_{12}$), and so on.

The thickness of the anode active material-containing layer 120 is preferably not less than 10 μm nor more than 40 μm. A supported amount of the anode active material in the anode active material-containing layer 120 is preferably not less than 2.0 mg/cm$^2$ nor more than 5.0 mg/cm$^2$. The supported amount herein is a weight of the anode active material per unit area of the surface of the anode collector 116.

There are no particular restrictions on the conductive aid as long as it can enhance the electroconductivity of the anode active material-containing layer 120. The conductive aid can be one of the well-known conductive aids. Examples of such conductive aids include carbon blacks, carbon materials, fine powders of metals such as copper, nickel, stainless steel, and iron, mixtures of the carbon materials and metal fine powders, and electrically conductive oxides such as ITO.

There are no particular restrictions on the binder as long as it can bind particles of the anode active material and particles of the conductive aid to the anode collector 116. It can be one of the well-known binders. Examples of such binders include fluorocarbon polymers such as polyvinylidene fluoride (PVDF), polytetrafluoroethylene (PTFE), a tetrafluoroethylene-hexafluoropropylene copolymer (FEP), a tetrafluoroethylene-perfluoroalkylvinyl ether copolymer (PEA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); styrene-butadiene rubber (SBR), and so on.

There are no particular restrictions on a material of the anode collector 116 bound to the anode active material-containing layer 120, as long as it is a metal material normally used as a current collector for the anode active material-containing layer in the lithium-ion secondary battery. Examples of such metal materials include copper, nickel, and so on. An end of each anode collector 116 is provided with a tongue-like portion 116a as an outward extension of each current collector, as shown in FIGS. 1 and 2.

(Cathode Active Material-Containing Layer)

The cathode active material-containing layer 110 is a layer containing a cathode active material, a conductive aid, a binder, and so on. The cathode active material-containing layer 110 will be described below.

There are no particular restrictions on the cathode active material as long as it can implement reversible progress of occlusion and release of lithium ions, desorption and insertion (intercalation) of lithium ions, or doping and dedoping with lithium ions and counter anions (e.g., $ClO_4^-$) to the lithium ions. The cathode active material can be one of the known electrode active materials. Examples thereof include lithium cobaltate ($LiCoO_2$), lithium nickelate ($LiNiO_2$), lithium manganese spinel ($LiMn_2O_4$), composite metal oxides represented by general formula: $LiNi_xCo_yMn_zO_2$ (x+y+z=1), and composite metal oxides such as lithium vanadium compounds ($LiV_2O_5$), olivine type $LiMPO_4$ (where M is Co, Ni, Mn, or Fe), and lithium titanate ($Li_4Ti_5O_{12}$).

The thickness of the cathode active material-containing layer 110 is preferably not less than 10 μm nor more than 40 μm. A supported amount of the cathode active material in the cathode active material-containing layer 110 can be optionally and suitably set corresponding to the supported amount of the anode active material in the anode active material-containing layer 120, but it is preferably, for example, not less than 3.0 mg/cm$^2$ nor more than 10.0 mg/cm$^2$.

The constituent elements other than the cathode active material in the cathode active material-containing layer 110 can be the same materials as those in the anode active material-containing layer 120. The cathode active material-containing layer 110 also preferably contains the same conductive aid as in the anode active material-containing layer 120.

There are no particular restrictions on the cathode collector 115 bound to the cathode active material-containing layer 110, as long as it is a metal material normally used as a current collector for the cathode active material-containing layer in the lithium-ion secondary battery. Examples of such metal materials include aluminum and others. An end of each cathode collector 115 is provided with a tongue-like portion 115a as an outward extension of each current collector, as shown in FIGS. 1 and 2.

(Separator)

The separator 140 disposed between the anode active material-containing layer 120 and the cathode active material-containing layer 110 is made of an electrically insulating porous material. There are no particular restrictions on the material of the separator 140, and it can be one of the well-known separator materials. Examples of such separator materials include film laminates of polyethylene, polypropylene, or polyolefin, stretched films of mixtures of the foregoing polymers, or nonwoven fabric of fiber consisting of at least one constituent material selected from the group consisting of cellulose, polyester, and polypropylene.

In each secondary battery element 161-164, as shown in FIG. 2, the areas of the separator 140, the anode active material-containing layer 120, and the cathode active material-containing layer 110 decrease in the order named, the end faces of the anode active material-containing layer 120 are projecting outward from the end faces of the cathode active material-containing layer 110, and the end faces of the separator 140 are projecting outward from the end faces of the anode active material-containing layer 120 and the cathode active material-containing layer 110.

This configuration facilitates the following: if the layers have some positional deviation in the direction intersecting with the lamination direction because of errors or the like during production, the entire surface of the cathode active material-containing layer 110 can face the anode active material-containing layer 120 in each secondary battery element 161-164. Therefore, lithium ions released from the cathode active material-containing layer 110 are adequately taken through the separator 140 into the anode active material-containing layer 120. If lithium ions are not adequately taken into the anode active material-containing layer 120, the lithium ions not taken into the anode active material-containing layer 120 deposit to reduce carriers of electric energy, which could deteriorate the energy capacity of the battery. Furthermore, since the separator 140 is larger than the cathode active material-containing layer 110 and the anode active material-containing layer 120 and projecting from the end faces of the cathode active material-containing layer 110 and the anode active material-containing layer 120, it reduces short circuits due to contact between the cathode active material-containing layer 110 and the anode active material-containing layer 120.

(Electrolyte Solution)

The electrolyte solution is contained in the anode active material-containing layer 120 and the cathode active material-containing layer 110 and in pores of the separator 140. There are no particular restrictions on the electrolyte solution, and the electrolyte solution can be, for example, an electrolyte solution (an aqueous electrolyte solution, or an electrolyte solution using an organic solvent) containing a lithium salt, which is used in the well-known lithium-ion secondary battery elements. However, the aqueous electrolyte solution has a low electrochemical decomposition voltage and thus the withstanding voltage in charging is limited to a low level; therefore, it is preferable to adopt an electrolyte solution using an organic solvent (i.e., a nonaqueous electrolyte solution). The electrolyte solution of the secondary battery elements preferably used herein is a nonaqueous electrolyte solution in which a lithium salt is dissolved in a nonaqueous solvent (an organic solvent). The lithium salt used herein can be, for example, one of salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used singly or in combination of two or more.

The organic solvent can be any one of solvents used in the well-known secondary battery elements. Examples of such organic solvents preferably applicable include propylene carbonate, ethylene carbonate, diethyl carbonate, and so on. These may be used singly or as a mixture of two or more at any ratio.

In the present embodiment the electrolyte solution may be a gel electrolyte obtained by adding a gelatinizing agent, as well as the liquid electrolyte. A solid electrolyte (a solid polymer electrolyte or an electrolyte consisting of an ion-conductive inorganic material) may be contained instead of the electrolyte solution.

(Case)

There are no particular restrictions on the case 150 as long as it can hermetically seal the laminate structure 185 and prevent intrusion of air and water into the case. The case 150 can be one of cases used for the well-known secondary battery elements. For example, it can be one made of a synthetic resin such as epoxy resin or one made by laminating a metal sheet of aluminum or the like with resin. The case 150, as shown in FIG. 1, is one obtained by folding a rectangular flexible sheet 151C into two parts on a nearly longitudinal center thereof, and sandwiches the laminate structure 185 between them on both sides in the lamination direction (vertical direction). Among the edges of the sheet 151C folded into two parts, sealed portions 150b, 150b, and 150c of three sides except for a folded portion 150a are bonded by heat sealing or with an adhesive to hermetically seal the laminate structure 185 inside.

(External Terminals)

The external terminal 113 and external terminal 123, as shown in FIG. 1, extend from the interior of the case 150 across the sealed portion 150c to the outside of the case 150. The external terminal 113 and the external terminal 123 are separated from each other in the direction perpendicular to the lamination direction of the laminate structure 185.

The external terminal 113 is composed of a lead 112 of a flat plate shape, and an insulator 114 covering a part thereof pinched by the sealed portion 150c of the case 150, and the external terminal 123 is composed of a lead 122 of a flat plate shape, and an insulator 114 covering a part thereof pinched by the sealed portion 150c of the case 150.

An end of the lead 112 in the case 150, as shown in FIG. 1, is welded to each of the tongue-like portions 115a, 115a, 115a of the respective cathode collectors 115, 115, 115 by resistance welding or the like and the lead 112 of the external terminal 113 is electrically connected to each cathode (first electrode). Specifically, the lead 112 is electrically connected through each of the cathode collectors 115 to each cathode active material-containing layer 110. The lead 112 is made of a conductive material such as metal. This conductive material can be, for example, aluminum or the like.

On the other hand, an end of the lead 122 in the case 150 is welded to the tongue-like portions 116a, 116a of the respective anode collectors 116, 116 and the lead 122 is electrically connected to each anode (second electrode). Specifically, the lead 122 is electrically connected through each anode collector 116 to each anode active material-containing layer 120. The lead 122 is also made of a conductive material such as metal. This conductive material can be, for example, an electrically conductive material such as copper or nickel.

The insulators 114 are provided for enhancing the sealing performance between the leads 112, 122 and the sealed portion 150c of the case 150. There are no particular restrictions on a material of the insulators 114, but they are made, for example, of synthetic resin.

Figure 3:
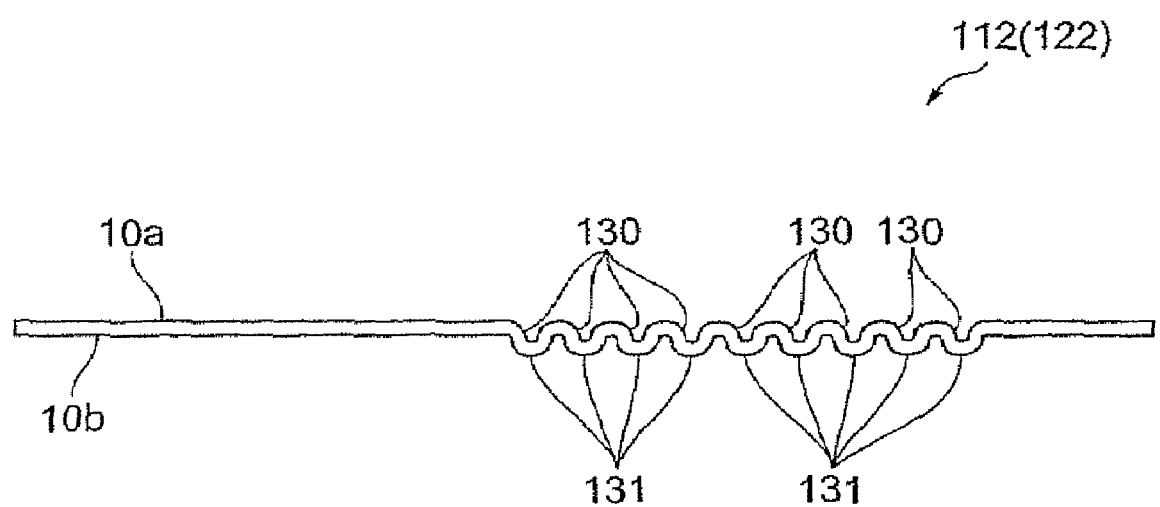
FIG. 3 is a side view showing leads used in the electrochemical device shown in FIG. 1.

The leads 112, 122 will be described below in more detail. FIG. 3 is a side view showing the leads 112, 122 in the present embodiment and FIG. 4 a plan view of the leads 112, 122 in the present embodiment.

Figure 4:
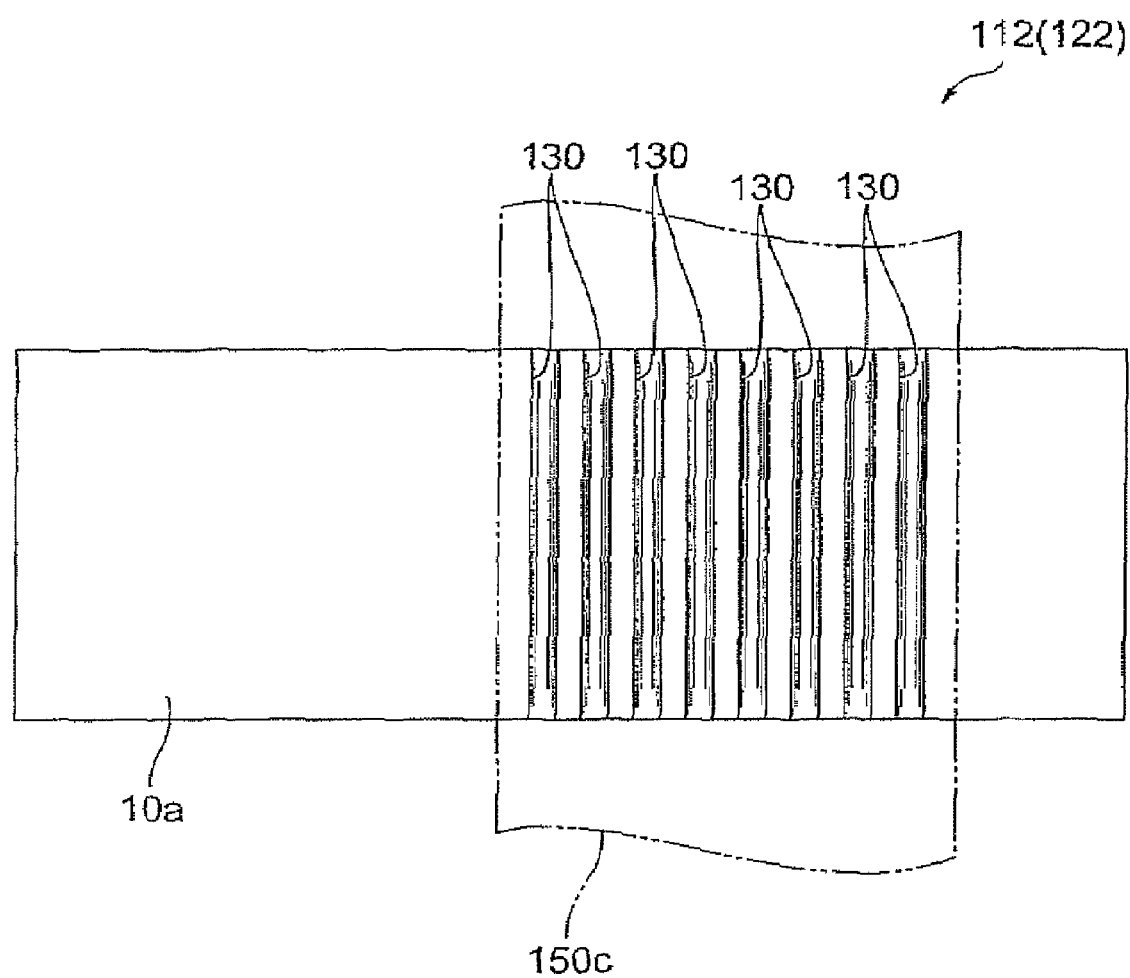
FIG. 4 is a plan view showing the leads used in the electrochemical device shown in FIG. 1.

As shown in FIGS. 3 and 4, a plurality of grooves 130 are formed along the extending direction of the lead 112, 122 in a first principal surface 10a of each lead 112, 122, and each groove 130 is formed so as to cross the extending direction of the lead 112 at right angles. The grooves 130 are formed throughout the entire width of the lead 112, 122.

On the other hand, a plurality of projected portions 131 are formed along the extending direction of the lead 112, 122 in a second principal surface 10b on the opposite side to the first principal surface 10a, and each projected portion 131 is formed so as to cross the extending direction of the lead 112 at right angles. The projected portions 131 are formed throughout the entire width of the lead 112, 122.

More specifically, the projected portions 131 in the second principal surface 10b of the lead 112, 122 correspond to portions forming the grooves 130 in the first principal surface 10a of the lead 112, 122. Namely, the grooves 130 are formed in the first principal surface 10a of the lead 112, 122 whereby the projected portions 131 are formed in the second principal surface 10b.

In this lithium secondary battery 100, the grooves 130 are formed in the first principal surface 10a of each lead 112, 122 and the projected portions 131 in the second principal surface 10b. For this reason, even if water penetrates from the outside of the case 150 into the interior of the case 150, the path of passage of water is longer in this lithium secondary battery 100 than in the case where the grooves 130 are not provided in the first principal surface 10a and where the projected portions 131 are not provided in the second principal surface 10b. This can adequately suppress the penetration of water Therefore, it is feasible to ensure the reliability of the lithium secondary battery 100. Since the grooves 130 are formed in the first principal surface 10a of each lead 112, 122 and the projected portions 131 in the second principal surface 10b, the contact area is increased between the lead 112, 122 and the insulator 114 in contact therewith. For this reason, adhesion is adequately enhanced between the lead 112, 122 and the insulator 114 even if the width of the sealed portion 150c is small.

Figure 5:
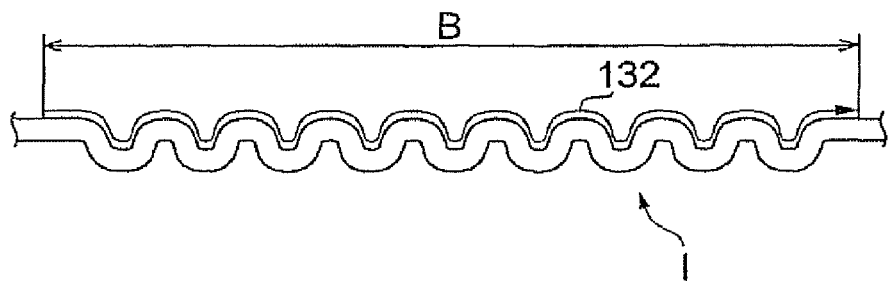
FIG. 5 is a drawing showing the leads used in the electrochemical device shown in FIG. 1.
Figure 5:
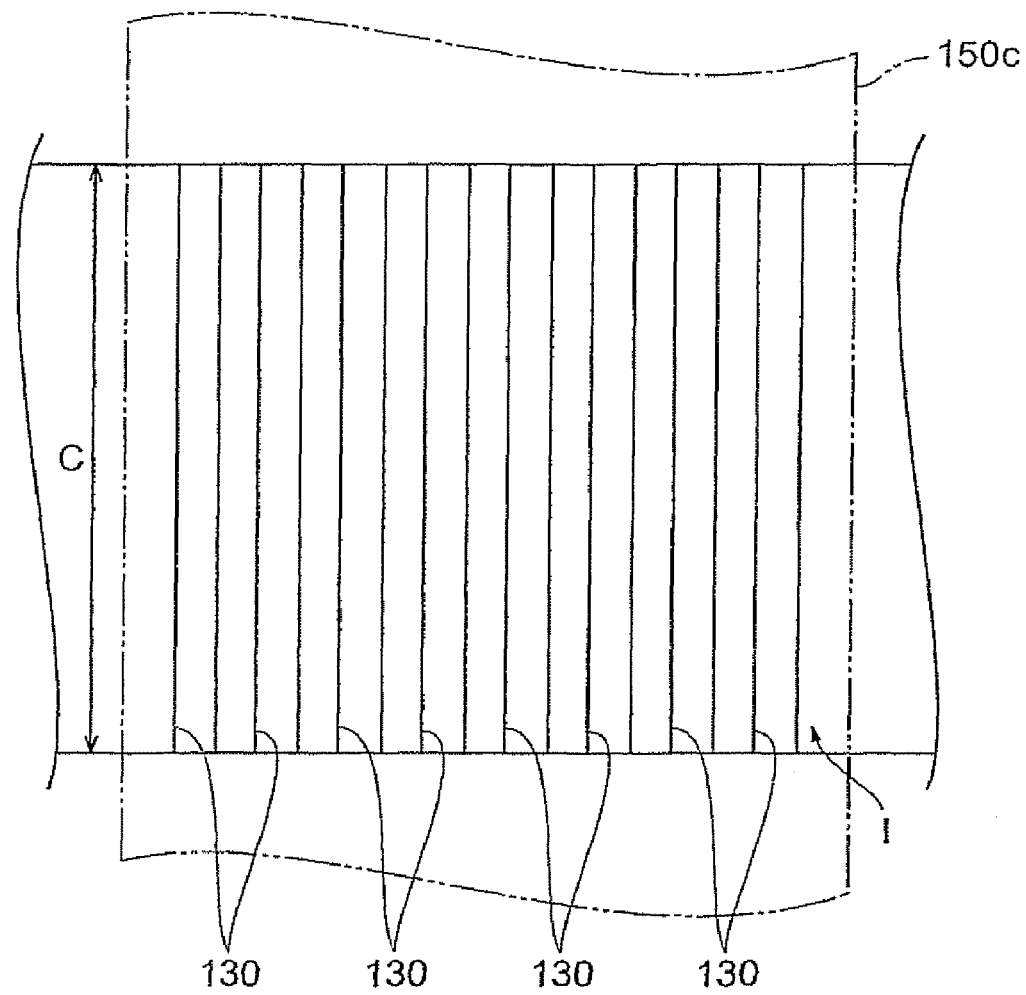

In the lithium secondary battery 100, as shown in (a) of FIG. 5, a length (A) along the surface of intersection I crossing the sealed portion 150c is preferably not less than 1.1 times a length (B) of the sealed portion 150c along the extending direction of the lead 112, 122. The length (A) along the surface of the intersection I of the sealed portion 150c herein refers to a length of a meandering arrow 132 wriggling along the surface of the intersection I as shown in (a) of FIG. 5. In this case, the penetration of water is suppressed more adequately than in cases where A/B is less than 1.1.

In the lithium secondary battery 100, as shown in (b) of FIG. 5, the length (A) along the surface of the intersection I is preferably not less than 1.1 nor more than 3.0 times the width (C) of the lead 112, 122. In this case, the penetration of water is suppressed more adequately than in cases where A/C is off the above range.

(Production Method)

The following will describe an example of the production method of the above-described lithium-ion secondary battery 100.

The first step is to prepare each of coating solutions (slurries) containing the constituent materials for formation of electrode layers to become the anode active material-containing layers 120 and the cathode active material-containing layers 110. The coating solution for anode active material-containing layers is a solvent containing the aforementioned anode active material, conductive aid, binder, etc., and the coating solution for cathode active material-containing layers is a solvent containing the aforementioned cathode active material, conductive aid, binder, and so on. There are no particular restrictions on the solvents used in the coating solutions, as long as the binder can be dissolved therein and the active material and the conductive aid can be dispersed therein. For example, the solvents can be N-methyl-2-pyrrolidone, N,N-dimethylformamide, or the like.

The next step is to prepare the cathode collectors 115 of aluminum or the like and the anode collectors 116 of copper, nickel, or the like. As shown in FIG. 2, the coating solution for cathode active material-containing layers is applied onto surfaces of the cathode collectors 115 and dried to form the cathode active material-containing layers 110 on the respective surfaces. The coating solution for anode active material-containing layers is applied onto surfaces of the anode collectors 116 and dried to form the anode active material-containing layers 120 on the respective surfaces.

There are no particular restrictions on techniques of applying the coating solutions onto the current collectors, and an application method may be optionally determined according to the material, shape, etc. of the metal sheets for current collectors. Examples of application methods applicable herein include metal mask printing, electrostatic coating, dip coating, spray coating, roll coating, a doctor blade method, gravure coating, screen printing, and so on. The resultant after the application is rolled by platen press, calendering, or the like if necessary.

The cathode active material-containing layer 110 and the anode active material-containing layer 120 are not formed on either side of the tongue-like portions 115a, 116a.

Next, the separators 140 are prepared. The separators 140 are made by cutting an electrically insulating porous material in a rectangular shape larger than the rectangular shape of the anode active material-containing layer 120 in each three-layered laminate.

The subsequent step is to stack the cathode collectors 115 having their respective cathode active material-containing layers 110 and the anode collectors 116 having their respective anode active material-containing layers 120, with the separator 140 in between in the order of FIG. 2, and thereafter heat them while pinching the in-plane central region on both sides in the lamination direction, thereby obtaining a laminate structure 185 as shown in FIG. 2.

Figure 6:
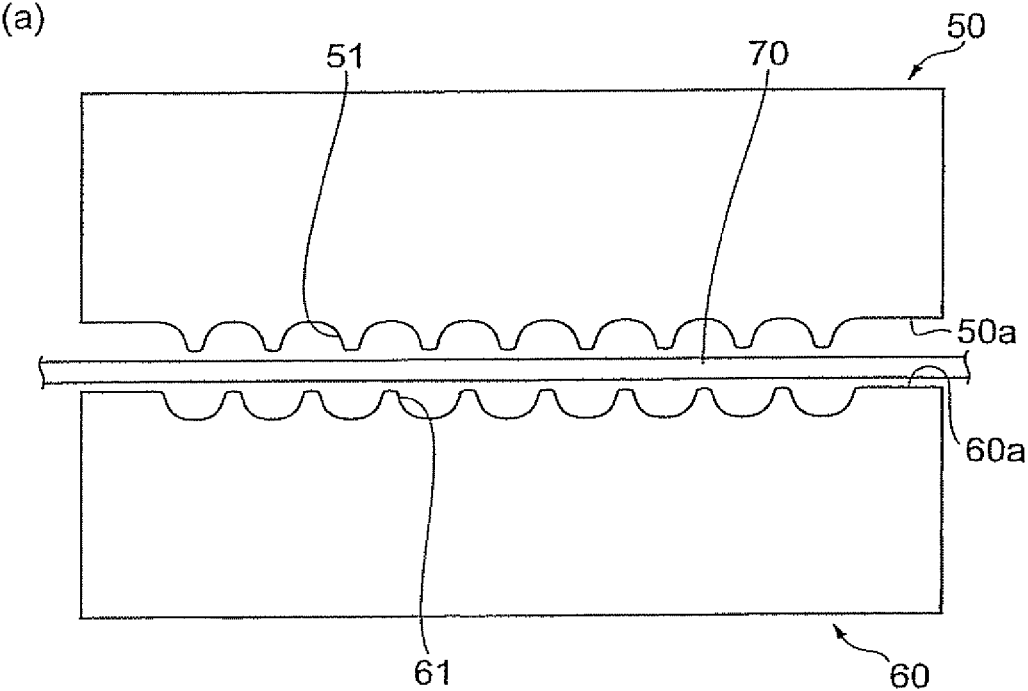
FIG. 6 is a process diagram showing a sequence of steps of making the leads used in the electrochemical device shown in FIG. 1.
Figure 6:
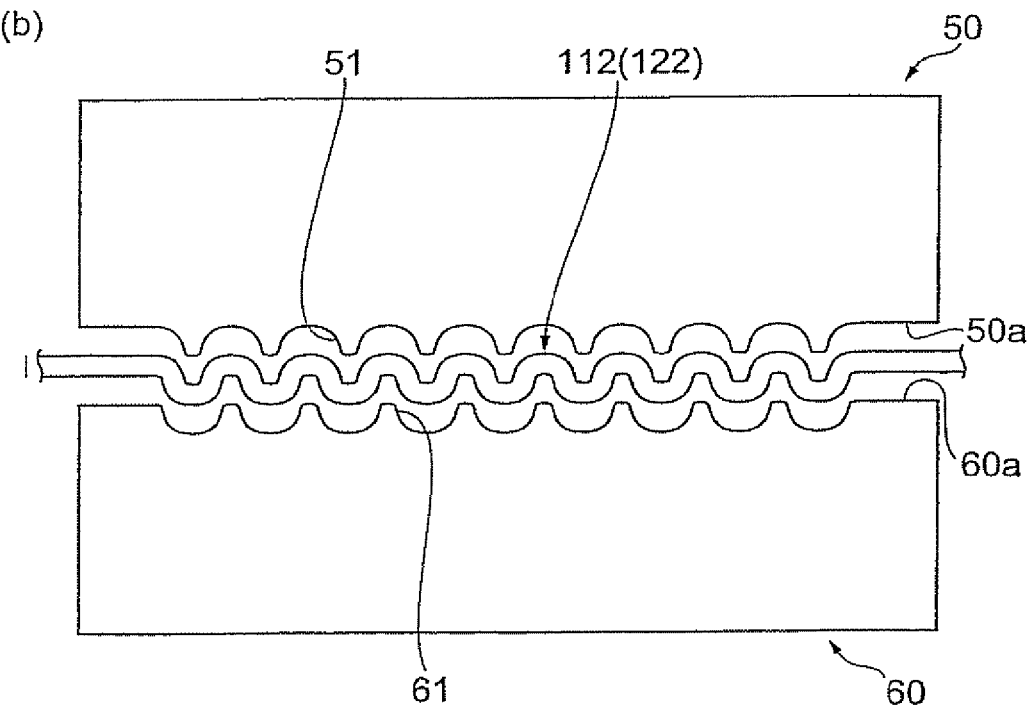

On the other hand, the leads 112, 122 shown in FIG. 2 are prepared. The leads 112, 122 are made using an upper block 50 and a lower block 60, as shown in (a) of FIG. 6. The upper block 50 has a flat surface 50a and a plurality of projected portions 51 on the flat surface 50a. Each projected portion 51 has a shape complementary to a groove 130 formed in the lead 112, 122 and the plurality of projected portions 51 are arranged in juxtaposition along a certain direction. The lower block 60 has a flat surface 60a and grooves 61 as many as the projected portions 51 in the upper block 50, in the flat surface 60a. Each groove 61 has a shape capable of receiving a projected portion 51 of the upper block 50. Then the lead 112, 122 can be made by sandwiching a metal member 70 of a flat plate shape between the upper block 50 and the lower block 60 and pressing it therebetween ((b) of FIG. 6). The aforementioned shapes (grooves 130 and projected portions 131) may also be formed in a flat platelike member by means of a member obtained by forming either or both of the upper block 50 and the lower block 60 in a gear shape and shape complementary to the grooves 130 formed in the lead 112, 122. In this case, the lead 112, 122 is prevented from being stretched during the press by the upper block 50 and the lower block 60 and therefore deterioration can be prevented in the mechanical strength of the lead 112, 122.

Next, each of the portions to be pinched by the sealed portion 150c in the leads 112, 122 obtained in this manner is covered by the insulator 114.

Subsequently, the end of the lead 112 is welded to the tongue-like portions 115a and the end of the lead 122 is welded to the tongue-like portions 116a, as shown in FIG. 2. This completes the laminate structure 185 to which the lead 112 and the lead 122 are connected.

The next step is to prepare a rectangular sheet 151C obtained by laminating the two sides of aluminum with a heat-adhesive resin layer, fold the sheet 151C in the center thereof to superimpose folded portions on each other, and heat-seal only the sealed portions 150b, 150b of the two sides in a desired seal width, for example, under a predetermined heating condition with a sealing machine. The subsequent step is to insert the laminate structure 185 in the interior of the case 150 through the sealed portion 150c not sealed yet. The subsequent step is to pour the electrolyte solution into the case 150 in a vacuum vessel to immerse the laminate structure 185 in the electrolyte solution. Thereafter, the lead 112 and the lead 122 are placed so as to extend from the interior of the case 150 across the sealed portion 150c to the outside. Then the sealed portion 150c of the case 150 is heat-sealed by means of a heat-sealing machine. At this time, the insulators 114 and the sealed portion 150c are heat-sealed with the insulators 114 of the external terminals 113, 123 being pinched by the sealed portion 150c. The heat-sealing at this time is carried out preferably under a reduced pressure environment, e.g., in a vacuum vessel. This completes fabrication of the lithium-ion secondary battery 100.

In the above production method, the step of heat-sealing the sealed portion 150c of the case 150 and the external terminals 113, 123 results in driving bubbles generated between the leads 112, 122 and the insulators 114 in contact therewith, away along the grooves 130 on the first principal surface 10a side of the leads 112, 122, driving bubbles away along gaps between adjacent projected portions 131 on the second principal surface 10b side of the leads 112, 122, and finally driving the bubbles away to the outside of the case 150. For this reason, the penetration of water due to bubbles is adequately suppressed. Since the grooves 130 are formed in the first principal surface 10*a* of each lead 112, 122, the path of passage of water is longer between the first principal surface 10*a* of the lead 112, 122 and the insulator 114 in the resulting lithium-ion secondary battery 100 than in the case without the grooves 130. Since the projected portions 131 are formed in the second principal surface 10*b* of each lead 112, 122, the path of passage of water is longer between the second principal surface 10*b* of the lead 112, 122 and the insulator 114 than in the case without the projected portions 131. For this reason, it becomes feasible to adequately suppress the penetration of water along the surfaces of the leads 112, 122. Furthermore, the contact area is increased between the leads 112, 122 and the insulators 114 in contact therewith. For this reason, adhesion is adequately enhanced between the leads 112, 122 and the insulators 114 even if the width of the sealed portion 150*c* is small. Therefore, the lithium secondary battery 100 is obtained in compact size and with sufficient reliability.

Second Embodiment

Figure 7:
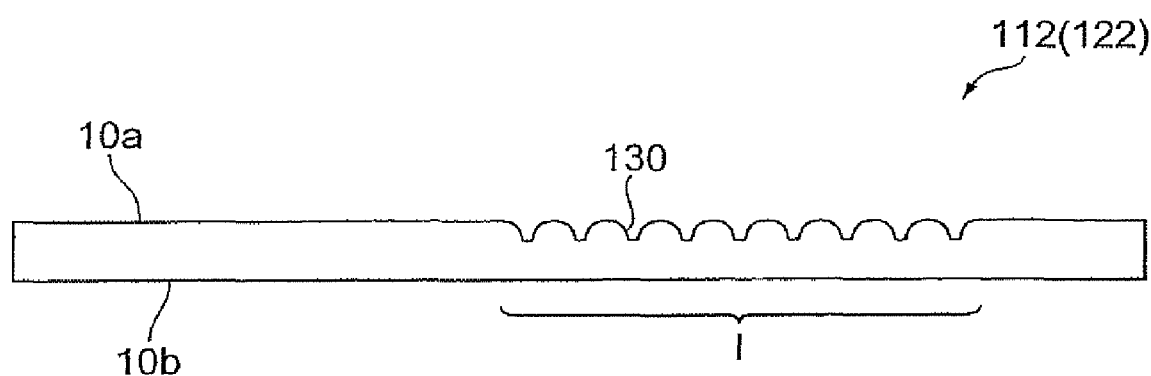
FIG. 7 is a sectional view showing the leads in another embodiment of the electrochemical device according to the present invention.

The second embodiment of the electrochemical device according to the present invention will be described below referring to FIG. 7. FIG. 7 is a sectional view showing the leads in the lithium secondary battery of the present embodiment. As shown in FIG. 7, the lithium secondary battery of the present embodiment is different from the lithium secondary battery 100 of the first embodiment in that the projected portions 131 are not formed in the second principal surface 10*b* of each lead 112, 122, i.e., the second principal surface 10*b* is flat.

In this case, even if water penetrates from the outside into the interior of the case 150, the penetration path of water is longer and the contact area is increased between the leads 112, 122 and the insulators 114, on the first principal surface 10*a* side where the grooves 130 are formed in the leads 112, 122; therefore, the penetration of water is adequately suppressed, when compared with the case where the grooves 130 are not formed in the first principal surface 10*a*.

In the present embodiment, the grooves 130 are provided only in the surface of the intersection I in each lead 112, 122 and the grooves 130 are not provided in the portions other than the intersection I. In this case, the strength of the leads 112, 122 is greater than in the case where the grooves 130 are also provided up to the surfaces of the portions other than the intersection I. Namely, the region of thin part due to the formation of grooves 130 is reduced, whereby the strength of the leads 112, 122 is increased.

Third Embodiment

Figure 8:
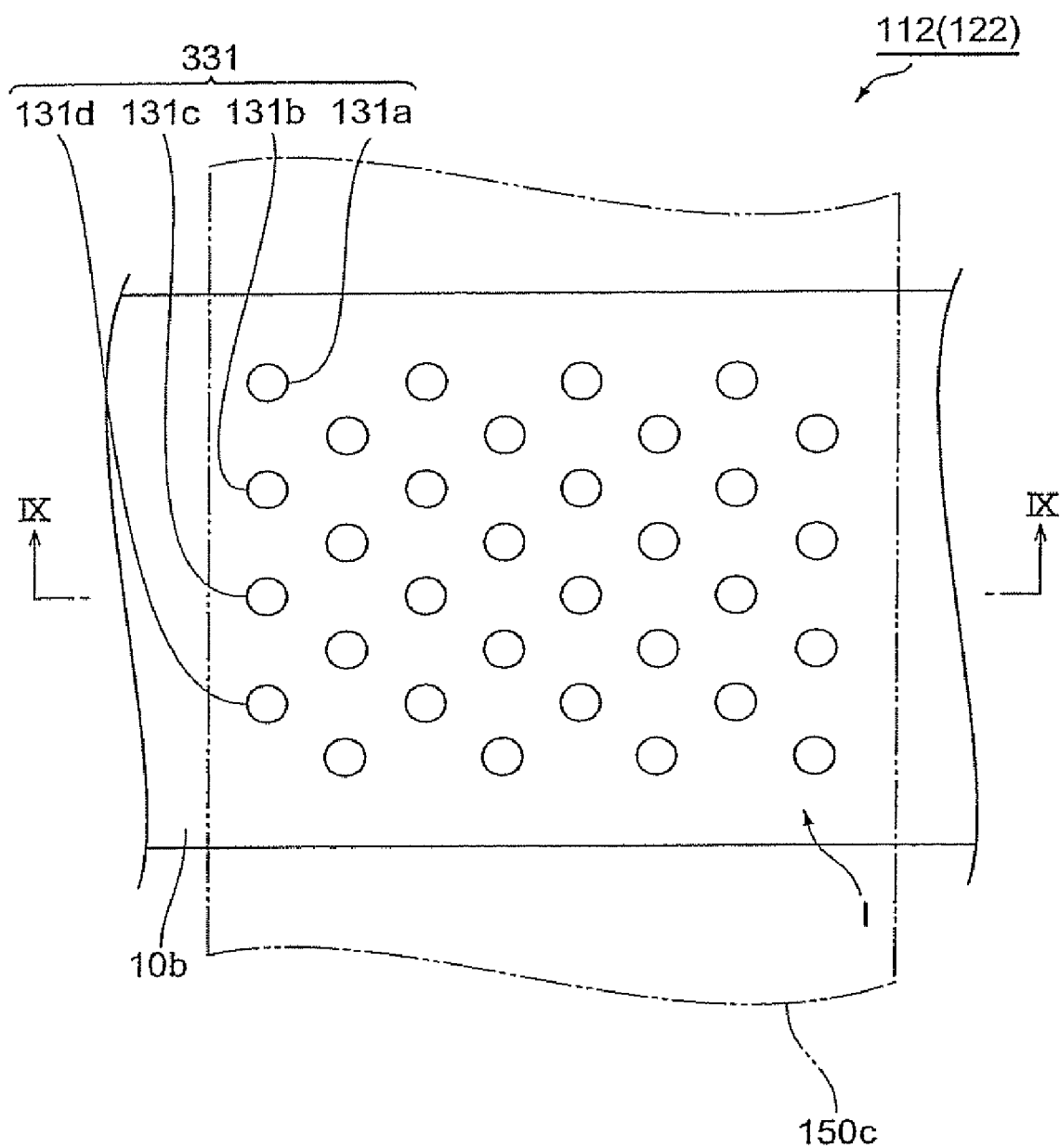
FIG. 8 is a plan view showing the leads in still another embodiment of the electrochemical device according to the present invention.
Figure 9:
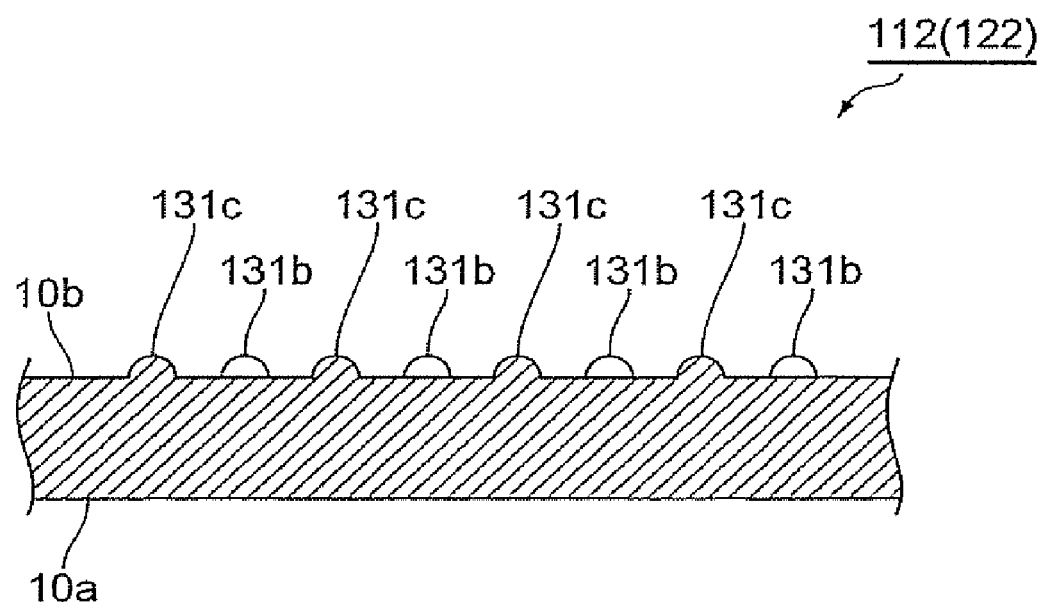
FIG. 9 is a sectional view along line IX-IX in FIG. 8

Next, the third embodiment of the electrochemical device according to the present invention will be described with reference to FIGS. 8 and 9. FIG. 8 is a plan view showing the leads in the lithium secondary battery of the present embodiment and FIG. 9 a sectional view along line IX-IX in FIG. 8. As shown in FIG. 9, the lithium secondary battery of the present embodiment is different from the lithium secondary battery 100 of the first embodiment in that the grooves 130 are not formed in the first principal surface 10*a* of each lead 112, 122, and in that a projected portion group 331 consisting of a plurality of projected portions is provided instead of each projected portion 131 in the second principal surface 10*b*. In this embodiment, each projected portion group 331 consists of four projected portions 131*a*-131*d* and these are arranged at a fixed pitch in a direction perpendicular to the extending direction of the lead 112, 122. Two adjacent projected portion groups 331 are arranged as shifted by a half pitch in the direction perpendicular to the extending direction of the lead 112, 122. There are no particular restrictions on the shape of the projected portions 131*a*-131*d*, but the shape can be, for example, a semispherical shape, a cylindrical shape, a quadrangular prism shape, or the like.

In this case, even if water penetrates from the outside into the interior of the case 150, water moves in a meandering path. Furthermore, the contact area is increased between the leads 112, 122 and the insulators 114. For this reason, the lithium-ion secondary battery is formed in compact size and with high reliability.

Figure 10:
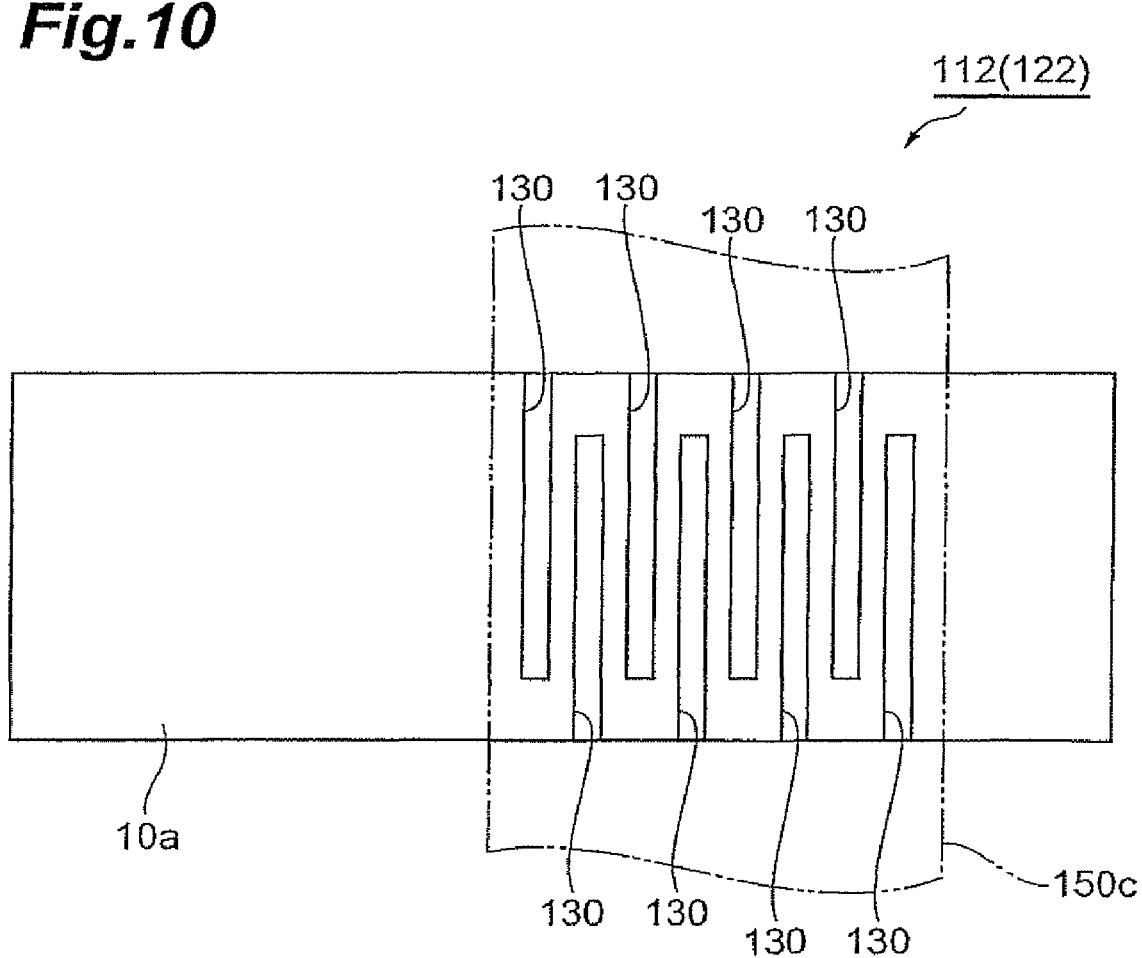
FIG. 10 is a plan view showing a modification example of the leads shown in FIG. 7.

The present invention is not limited to the above embodiments. For example, the first embodiment is the example wherein the grooves 130 and projected portions 131 are formed throughout the entire width of the leads 112, 122, but they may be formed only in part, instead of the entire width. In this case, however, from the viewpoint of driving bubbles away during the heat-sealing step to obtain the lithium secondary battery with higher reliability, one end of each groove 130 is preferably arranged to extend up to the edge of the lead 112, 122, as shown in FIG. 10.

A plurality of grooves 130 are formed in the first and second embodiments, but one groove may be formed. In this case, one projected portion 131 is also formed in the first embodiment.

Furthermore, the first embodiment is the example wherein the projected portions 131 are formed at the positions corresponding to the grooves 130 in the leads 112, 122, but the projected portions 131 do not have to be formed at the corresponding positions. Namely, the grooves 130 and the projected portions 131 may be formed independently of each other in the first principal surface 10*a* and in the second principal surface 10*b*, respectively, in the leads 112, 122.

The first to third embodiments adopt the method of preparing the rectangular sheet 151C obtained by laminating the two sides of aluminum with the heat-adhesive resin layer, folding the sheet 151C in the center to superimpose the folded portions on each other, heat-sealing only the sealed portions 150*b*, 150*b* of the two sides, and inserting the laminate structure 185 through the sealed portion 150*c* not sealed yet, into the interior of the case 150, but it is also possible to adopt a method of forming a recess in the rectangular sheet 151C obtained by laminating the two sides of aluminum with the heat-adhesive resin layer, placing the laminate structure 185 in this recess, thereafter superimposing a sheet without a recess on the sheet 151C, and then heat-sealing them except for only a part of the sealed portion. In is case, we can obtain the armor with an aperture. At this time, the external terminals 113, 123 are placed so as to extend across the sealed portion to the exterior of the armor.

Furthermore, the first to third embodiments adopt the configuration wherein the external terminal 113 is composed of the lead 112 and the insulator 114 and wherein the external terminal 123 is composed of the lead 122 and the insulator 114, but the external terminals 113, 123 do not always have to have the insulator 114. In this case, the leads 112, 122 become the external terminals 113, 123, respectively. In this case, even if water penetrates from the outside of the case 150 into the interior of the case 150, the path of passage of water is also longer than in the case without the grooves 130 and projected portions 131 because the grooves 130, projected portions 131, or the like are provided in the surfaces of the intersections I of the leads 112, 122. For this reason, it becomes feasible to adequately suppress the penetration of water. In addition, since the grooves 130 and projected portions 131 are provided in the surfaces of the intersections I of the leads 112, 122, the contact area is increased between the leads 112, 122 and the sealed portion 150c of the case 150 in contact therewith, and adhesion is adequately enhanced between the leads 112, 122 and the sealed portion 150c; therefore, it is feasible to adequately suppress the penetration of water due to separation between the leads 112, 122 and the sealed portion 150c. Therefore, it is feasible to enhance a retention rate of capacity of the lithium secondary battery 100 and to reduce an increase rate of resistance thereof.

The first to third embodiments were the examples wherein the laminate structure 185 had four secondary battery elements 161-164 as single cells, but the laminate structure may have five or more secondary battery elements or may have three or less secondary battery elements; e.g., it may have only one secondary battery element.

Furthermore, the first to third embodiments were described using the examples of the lithium secondary batteries as electrochemical devices, but the electrochemical devices may also be electric double-layer capacitors. In this case, the active material in the cathode active material-containing layers and the anode active material-containing layers can be, for example, acetylene black, graphite, black lead, activated carbon, or the like.

EXAMPLES

The present invention will be described below in further detail with examples and a comparative example, but it is noted that the present invention is by no means intended to be limited to these examples.

Example 1

First, polarizable layers were produced according to the following procedure. Specifically, materials prepared were activated carbon (RP-20: KURARAY CHEMICAL CO., LTD.) as an active material, carbon black as a conductive aid, and polyvinylidene fluoride (PVdF) as a binder, these were mixed and dispersed at a weight ratio of active material:conductive aid:binder=87:3:10 with a planetary mixer, and an appropriate amount of N-methylpyrrolidone (NMP) was added as a solvent therein to adjust the viscosity, thereby preparing a coating solution (slurry) of a slurry form.

Subsequently, an etching aluminum foil (20 μm thick) was prepared and the foregoing coating solution was applied onto the aluminum foil by the doctor blade method and dried to form an active material-containing layer. Next, the active material-containing layer thus applied was pressed with calendar rolls and the resultant was punched in the size of the active material-containing layer surface of 11 mm×16 mm and in the shape with the tongue-like portion. In this step, we produced current collectors with the active material-containing layer on one side only and current collectors with the active material-containing layer on both sides. The thickness of each active material-containing layer was 20 μm.

Then separators were formed by punching a porous film of polyolefin in the size of 12 mm×51 mm.

Subsequently, the laminate structure with three layers of electricity-storing elements was made by stacking the separators in a zigzag pattern so as to place each separator between the current collectors with the active material-containing layers, and the central region thereof was thermally compressed and fixed from the two outermost layer sides. They were stacked so that the current collectors with the polarizable layer on one side were located as the outermost layers of the laminate structure.

Next, an electrolyte solution was prepared as follows. Namely, the electrolyte solution was prepared by dissolving tetraethylammonium tetrafluoroborate ($TEA^+BF^{4-}$) as an electrolyte in a mixed organic solvent of sulfolane (SL) and diethyl carbonate (DEC) at the weight ratio of SL:DEC=1:1. At this time, the concentration of the electrolyte in the electrolyte solution was adjusted to 1.2 mol/l.

On the other hand, the external terminals were produced as follows. First, flat platelike members of aluminum foil (1N30-0 material) were prepared in the thickness of 0.08 mm, width of 2 mm, and length of 14 mm. Then each of the flat platelike members was pinched and pressed by the upper block 50 and lower block 60 shown in (a) of FIG. 6, to subject the surfaces of the flat platelike members to an uneven surface treatment to obtain leads in each of which eight grooves in the depth of 0.2 μm and the width of 0.8 μm were formed at intervals of 0.3 μm and eight projected portions in the depth of 0.2 μm and the width of 0.2 μm were formed at intervals of 0.3 μm in the opposite surface. Then the entire periphery of each lead was covered by an insulator of acid-modified polypropylene (ADMER QE060: Mitsui Chemicals, Inc.) so as to cover the region 4 mm long along the extending direction of the lead with the grooves and projected portions. The external terminals were obtained in this manner. Then the lead ends of the external terminals were attached to the tongue-like portions of the laminate structure by welding.

Next, a case with an aperture on one side was prepared by forming an aluminum laminate film in a bag form, the laminate structure was inserted through the aperture into the case, a nonaqueous electrolyte solution was poured into the case in a vacuum chamber, and the laminate structure was made impregnated with the nonaqueous electrolyte solution. Thereafter, the leads were placed so as to cross the sealed portion of the case in a reduced pressure state and the aperture of the case was heat-sealed while the leads extended in part to the outside of the case. At this time, the width of the sealed portion was 2.5 mm. In this manner, a multilayer electric double-layer capacitor was obtained in the size of 20 mm×25 mm×0.5 mm.

Example 2

An electric double-layer capacitor was fabricated in the same manner as in Example 1, except that the depth of the grooves was increased from that in Example 1 to increase $\beta(=A/B)$ to 3.0.

Example 3

An electric double-layer capacitor was fabricated in the same manner as in Example 1, except that the leads were made by pinching and pressing the flat platelike members by the upper block and the lower block to form eight parallel rows of projected portion groups in each of which four projected portions were arrayed at the pitch of 500 μm in a line, in only one side of each flat plate member. At this time, the projected portions were of a semispherical shape with the diameter of 250 μm and the intervals of the projected portion groups were 500 μm. The projected portion groups adjacent to each other were arranged as shifted by a half pitch.

Example 4

An electric double-layer capacitor was fabricated in the same manner as in Example 1, except that the depth of the grooves was increased from that in Example 1 to increase β to 5.0.

Comparative Example 1

An electric double-layer capacitor was fabricated in the same manner as in Example 1, except that the external terminals were made without subjecting the flat platelike members to the uneven surface treatment.

A cell discharge capacity retention rate and a cell resistance increase rate were measured with each of the electric double-layer capacitors of Examples 1-4 and Comparative Example 1 described above. The results are presented in Table 1.

The cell discharge capacity retention rate and the cell resistance increase rate were calculated as described below. The cell discharge capacity retention rate was calculated as follows: with each of the electric double-layer capacitors of Examples 1-4 and Comparative Example 1, the voltage of 1.65 V was applied thereto at 60° C. to turn on electricity; the cell discharge capacity was measured at a beginning (at a start of electricity supply) and the cell discharge capacity was measured after passage of 2000 hours; the cell discharge capacity retention rate (%) was calculated based on the following formula: cell discharge capacity retention rate (%)=100×(cell discharge capacity after passage of 2000 hours)/(initial cell discharge capacity).

The cell resistance increase rate was calculated as follows: with each of the electric double-layer capacitors of Examples 1-4 and Comparative Example 1, the voltage of 1.65 V was applied thereto at 60° C. to turn on electricity; the initial cell resistance and the cell resistance after passage of 2000 hours were measured; the cell resistance increase rate was calculated based on the following formula: cell resistance increase rate (%)=100×(cell resistance after passage of 2000 hours)/(initial cell resistance).

TABLE 1

| | Presence/ absence of uneven surface treatment | Surface condition of leads | β | Capacity retention rate of cell after lapse of 2000 hr (%) | Resistance increase rate of cell after lapse of 2000 hr (%) |
|---|---|---|---|---|---|
| Example 1 | present | grooves and projections | 2.0 | 70.6 | 119.2 |
| Example 2 | present | grooves and projections | 3.0 | 70.3 | 119.8 |
| Example 3 | present | only projections | 1.1 | 67.8 | 123.3 |
| Example 4 | present | grooves and projections | 5.0 | 64.2 | 126.7 |
| Comparative Example 1 | absent | flat | 1.0 | 58.6 | 137.1 |

It was found from the results in Table 1 that the electric double-layer capacitors of Examples 1-4 had the cell capacity retention rate after the electricity flow of 2000 hours larger and the cell resistance increase rate smaller than those of the electric double-layer capacitor of Comparative Example 1, even though the width of the sealed portion was as small as 2.5 mm.

It was confirmed from this result that the electrochemical devices of the present invention were formed in compact size and with high reliability.

What is claimed is:

1. An electrochemical device comprising:
   an armor;
   a structure housed in the armor and having a first electrode, a second electrode, and a separator disposed between the first electrode and the second electrode; and
   external terminals with respective leads connected to the first electrode and the second electrode of the structure, respectively, and extending from an interior of the armor across a sealed portion of the armor to the outside, each lead having a first principal surface and a second principal surface, opposed to the first principal surface, wherein
   at an intersection in each of the leads crossing the sealed portion, the first principal surface includes a plurality of grooves formed so as to cross an extending direction of the lead and the second principal surface includes a plurality of projected rims formed so as to cross the extending direction of the lead, each of the projected rims in the second principal surface of the lead is formed at the portion corresponding to each of the grooves in the first principal surface of the lead.

2. The electrochemical device according to claim 1, wherein the projected rims are formed in the second principal surface of the lead by forming the grooves in the first principal surface of the lead.

3. The electrochemical device according to claim 1, wherein a length along the first principal surface of each lead at the intersection is not less than 1.1 times a length of the sealed portion along an extending direction of each lead.

4. The electrochemical device according to claim 1, wherein a length along the first principal surface of each lead at the intersection is not less than 1.1 nor more than 3.0 times a width of each lead.

* * * * *